(No Model.) 3 Sheets—Sheet 1.
T. R. ROSSITER.
CORDING ATTACHMENT FOR SEWING MACHINES.
No. 415,000. Patented Nov. 12, 1889.
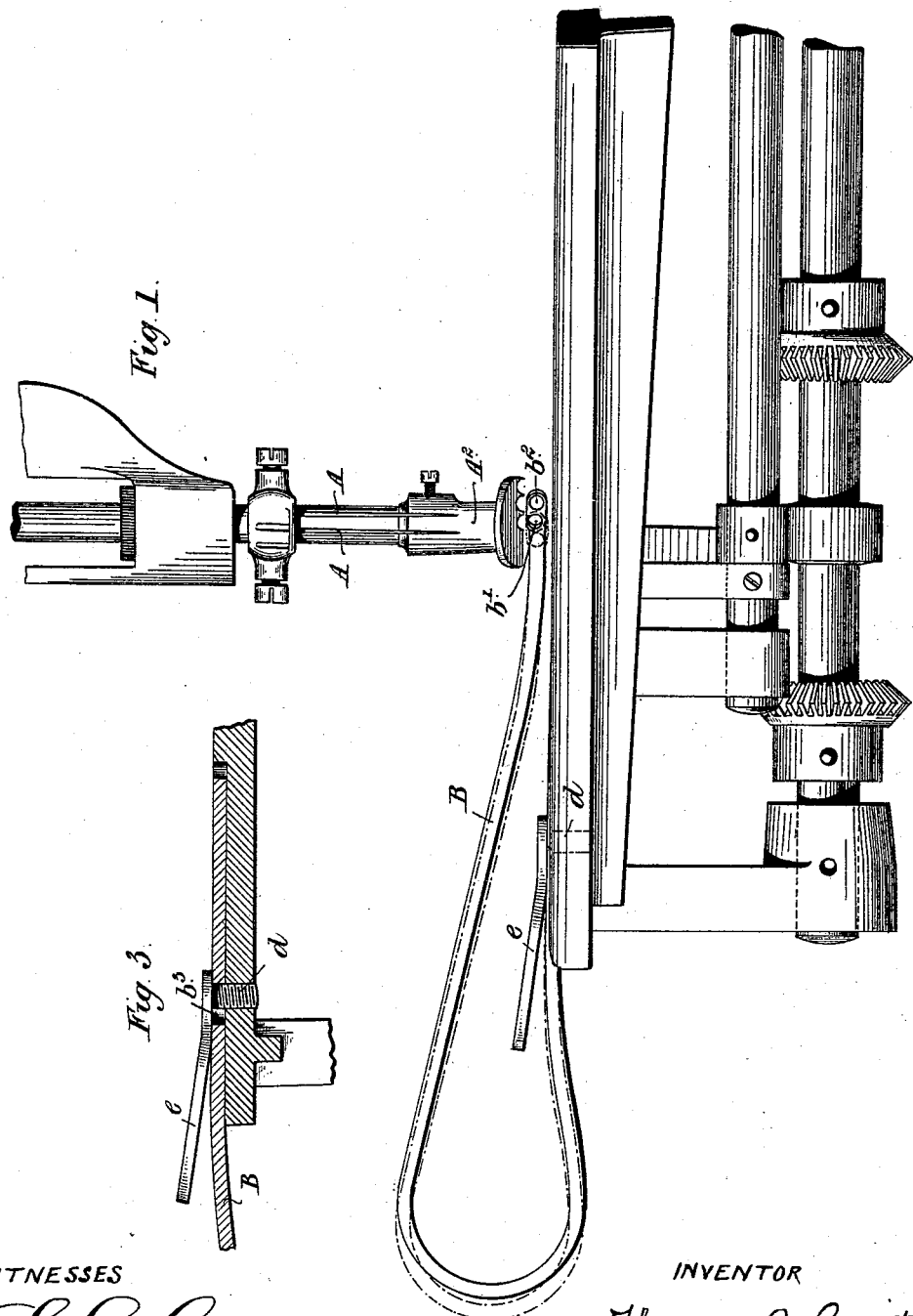

(No Model.) 3 Sheets—Sheet 2.
T. R. ROSSITER.
CORDING ATTACHMENT FOR SEWING MACHINES.
No. 415,000. Patented Nov. 12, 1889.
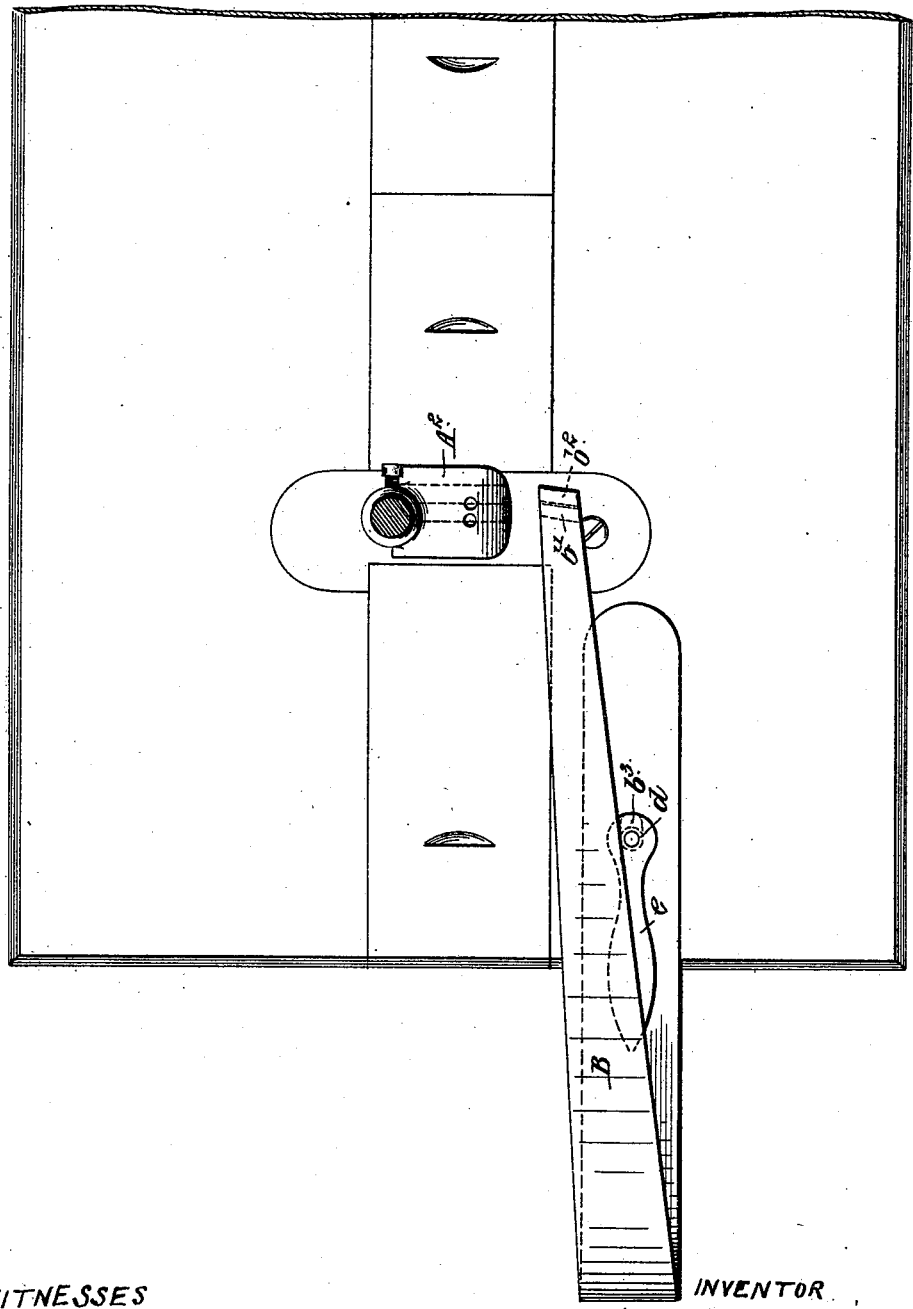
WITNESSES
S. C. Connor
John Revell
INVENTOR
Thomas R. Rossiter
by his Attorneys
Howson and Howson (No Model.) 3 Sheets—Sheet 3.
T. R. ROSSITER.
CORDING ATTACHMENT FOR SEWING MACHINES.
No. 415,000. Patented Nov. 12, 1889.
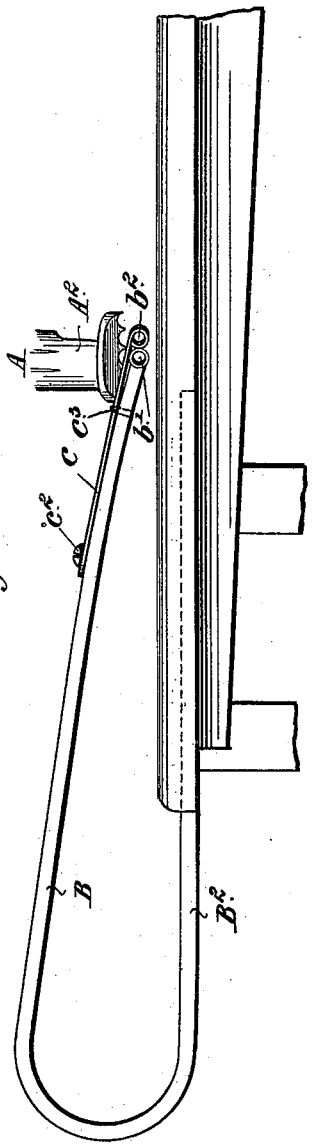
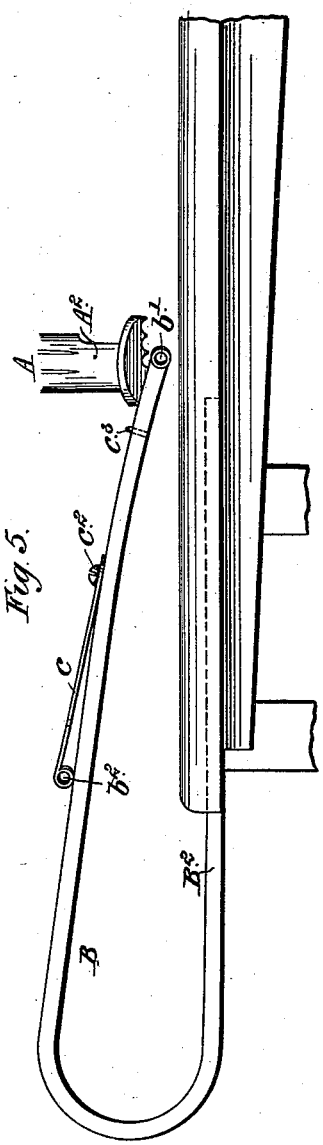

UNITED STATES PATENT OFFICE.

THOMAS R. ROSSITER, OF LONDON, ENGLAND, ASSIGNOR TO CHAPPELL, ALLEN & CO., OF SAME PLACE.

CORDING ATTACHMENT FOR SEWING-MACHINES.

SPECIFICATION forming part of Letters Patent No. 415,000, dated November 12, 1889.

Application filed December 12, 1888. Serial No. 293,348. (No model.) Patented in England October 20, 1888, No. 15,114.

*To all whom it may concern:*

Be it known that I, THOMAS ROBERT ROSSITER, (of the firm of Chappell, Allen & Co., corset-manufacturers, of 24 Basinghall Street, in the city of London, England,) a subject of the Queen of Great Britain, residing at 24 Basinghall Street aforesaid, have invented an Improved Attachment for Double-Line Sewing-Machines for Piping or Cording or the like, (for which I, in conjunction with John Chappell, of the said firm of Chappell, Allen & Co., have applied for a patent in Great Britain, No. 15,114, dated October 20, 1888,) of which the following is a specification.

This invention has for its object to provide an attachment to be used for piping, cording, or the like in double-line sewing-machines—such, for instance, as the one forming the subject-matter of my application for patent for improved sewing-machine, Serial No. 268,455, filed March 26, 1888. The attachment for this purpose must be such that it can be used either for guiding in sewing in one row of piping, cording, or the like by the two rows of stitching formed by the machine, or for guiding in sewing in two rows of such piping, cording, or the like between the two rows of stitching formed by the machine and one of the rows of stitching already formed. It is desirable, for the purpose of sewing in the rows of piping, cording, or the like, as aforesaid, to arrange the attachment so that the one row of piping, cording, or the like is fed in line between the two rows of stitching without there being any obstacle in the way of bringing the piping or cording up close to a row or rows which may have been previously formed, and also so that two rows of piping, cording, or the like can be fed one in line between the two rows of stitching, and the other piping, cording, or the like between one of the rows of stitching previously made and one of the rows of stitching being made by the machine.

Figure 1 of the accompanying drawings is an elevation, and Fig. 2 is a plan, of part of a double-row sewing-machine with an attachment according to this invention in place. Fig. 3 is a vertical section of part of the same, and Figs. 4 and 5 show the two positions of a modification.

A A are the two needles of the machine, and $A^2$ is the presser-foot.

B is the attachment for guiding the pipings, cordings, or the like, as aforesaid, which attachment carries two guides $b'$ $b^2$ for the piping, cording, or the like, so arranged that either the inner guide can be turned out of the way when one row of piping, cording, or the like is to be sewed in, or so that the attachment can be bodily moved and the inner guide be caused to take the position formerly occupied by the outer guide. In the former case, which is shown in Figs. 4 and 5, I can mount the inner guide $b^2$ upon a spring $c$, movably secured to the attachment, (as by being centered at $c^2$,) so that it can be turned and held either in position (as in Fig. 4) or out of position, (as in Fig. 5,) as desired. $c^3$ is a stud which engages in a hole in the spring $c$ to hold the guide $b^2$ in the position shown in Fig. 4, the spring $c$ being raised so that the said hole is lifted from off the said stud $c^3$ when the guide $b^2$ is to be turned back, as shown in Fig. 5. In the latter case, which is shown in Figs. 1, 2, and 3, I can make the attachment B, or the part thereof carrying the guides, capable of being moved laterally of the lines of sewing, so as to bring the inner guide either to outside the row of stitching made by the inner needle or to between the rows of stitching made by the two needles. In order to give exact adjustment, the movement of the attachment B or the movable part thereof may be limited to the necessary extent by stops, and means be provided for fixing the attachment or movable part thereof in both of its positions. These means, as shown in the drawings, consist of a slot $b^3$ in the attachment, through which passes a screw $d$ with a handle, the said screw limiting the movement of the attachment by one or other end of the slot $b^3$ coming against the screw $d$, when, by means of the handle $e$ and screw $d$, the attachment is fixed in the position to which it has been brought by being pinched between the boss or nut of the handle and the bed-plate.

The attachment may be made a permanent part of or be fixed to the machine; but generally it will be more convenient to make it readily removable therefrom—for instance, by making the lower member or arm B² thereof slide in an undercut groove in the under side of the bed-plate; but in any case the attachment is in the form of an overhanging arm to be used on one side of the needle-bar only, so as to leave the other side free for the insertion and passage of the material being operated upon.

I claim as my invention—

1. An attachment for piping, cording, or the like in double-line sewing-machines, said attachment consisting of an overhanging arm for use on one side of the needle-bar, and having two guides for feeding in cords, one of said guides being adjustable with respect to the other into and out of position, as and for the purpose set forth.

2. An attachment for piping, cording, or the like in double-line sewing-machines, said attachment consisting of an overhanging arm for use on one side of the needle-bar, with a fixed guide on the arm and a movable guide carried by a spring pivoted to the arm, all substantially as and for the purpose set forth.

In testimony whereof I have signed my name to this specification in the presence of two subscribing witnesses.

THOMAS R. ROSSITER.

Witnesses:
E. HOLLOMON,
56 *Corn Street, Bristol, Clerk to W. H. Brown, Solicitor, Bristol.*
W. M. KEMP,
41 *Broad Street, Bristol, Accountant.*